United States Patent
Koh

[11] Patent Number: 5,740,151
[45] Date of Patent: Apr. 14, 1998

[54] OPTICAL TEST DISK HAVING A PLURALITY OF DIFFERENT FORMATS

[75] Inventor: Young-ok Koh, Suwon, Rep. of Korea

[73] Assignee: Samsung Electronics Co., Ltd., Kyungki-Do, Rep. of Korea

[21] Appl. No.: 754,267

[22] Filed: Nov. 20, 1996

[30] Foreign Application Priority Data

Feb. 8, 1996 [KR] Rep. of Korea .............. 96-3058

[51] Int. Cl.⁶ .................................................. G11B 7/24
[52] U.S. Cl. .................................... 369/275.3; 369/58
[58] Field of Search ................................ 369/275.3, 58, 369/48, 47, 278, 277, 292

[56] References Cited

U.S. PATENT DOCUMENTS

| | | | |
|---|---|---|---|
| 4,725,968 | 2/1988 | Baldwin et al. | 364/550 |
| 4,969,139 | 11/1990 | Azumatani et al. | 369/58 |
| 4,991,162 | 2/1991 | Tabe | 369/58 |
| 5,434,837 | 7/1995 | Haneda et al. | 369/54 |
| 5,463,766 | 10/1995 | Schieve et al. | 395/650 |
| 5,530,687 | 6/1996 | Yamaguchi | 369/58 |
| 5,530,960 | 6/1996 | Parks et al. | 395/825 |

*Primary Examiner*—Tan Dinh
*Attorney, Agent, or Firm*—Sughrue, Mion, Zinn, Macpeak & Seas, PLLC

[57] ABSTRACT

A test disk for testing operation of a disk drive is disclosed. In the test disk, a plurality of data types necessary for various testing operations of the disk drive are sequentially recorded on the disk at divided track portions. Accordingly, there is no need to exchange a plurality disk when the operation of the disk drive is tested. Thus, the productivity of manufacturing the disk drives is increased.

5 Claims, 2 Drawing Sheets

1. CONTENTS DATA
2. NORMAL DATA
3. ECCENTRICALLY RECORDED DATA
4. SCRATCHED REGION DATA
5. CD-ROM DATA
6. MOVING PICTURE DATA
7. PHOTO DATA

1. CONTENTS DATA
2. NORMAL DATA
3. ECCENTRICALLY RECORDED DATA
4. SCRATCHED REGION DATA
5. CD-ROM DATA
6. MOVING PICTURE DATA
7. PHOTO DATA

OPTICAL TEST DISK HAVING A PLURALITY OF DIFFERENT FORMATS

BACKGROUND OF THE INVENTION

The present invention relates to a test disk for testing operation of a disk drive.

FIG. 1 schematically shows the construction of a general disk drive. Referring to FIG. 1, a disk drive is provided with a spindle motor 12 for rotating a turntable 10 where a disk 11 is seated. A pickup 13 reproduces information recorded on the disk 11. A central processing unit (CPU) 14 controls the overall operation of the system. A digital signal processor (DSP) 16 outputs a drive signal to the spindle motor 12, and a servo signal processor (SSP) 15 outputs the signal received from the pickup 13 to the CPU 14. A ROM decoder 17 outputs the information received from the DSP 16 to an external computer system (not shown) through a PC interface 18. In the thus-constituted disk drive, the pickup 13 irradiates a light beam onto the surface of the disk 11 and receives the reflected light, to thereby detect recorded information.

The manufactured disk drive is tested in order to check whether a desired function can be smoothly performed. Such a test is performed by loading test disks into the manufactured disk drive and reproducing recorded information from the test disks. The test disks include, a normal disk such as a compact disk (CD), a CD-ROM title, a moving picture CD or a photo CD, and an abnormal disk such as an eccentric disk or a disk including a scratched region. The test disks are each loaded in the disk drive and the information recorded thereon is detected. Thus, it is tested whether the disk drive operates normally.

Accordingly, since a plurality of disks are sequentially loaded on the disk drive and then a state of operation of the disk drive is tested, the test disks should be exchanged one by one according to the kinds of operations being tested. As a result, time for exchanging the test disks amounts to a substantial delay. This time delay in the testing process hinders productivity.

SUMMARY OF THE INVENTION

Accordingly, it is an object of the present invention to provide a test disk for testing operation of a disk drive in which the tests for various functions of the disk drive can be performed with only one test disk.

To accomplish the object, there is provided a single test disk for testing operation of a disk drive, wherein a plurality of types of test data necessary for various testing operation of the disk drive are sequentially recorded on divided sections of tracks on the single test disk.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 1:
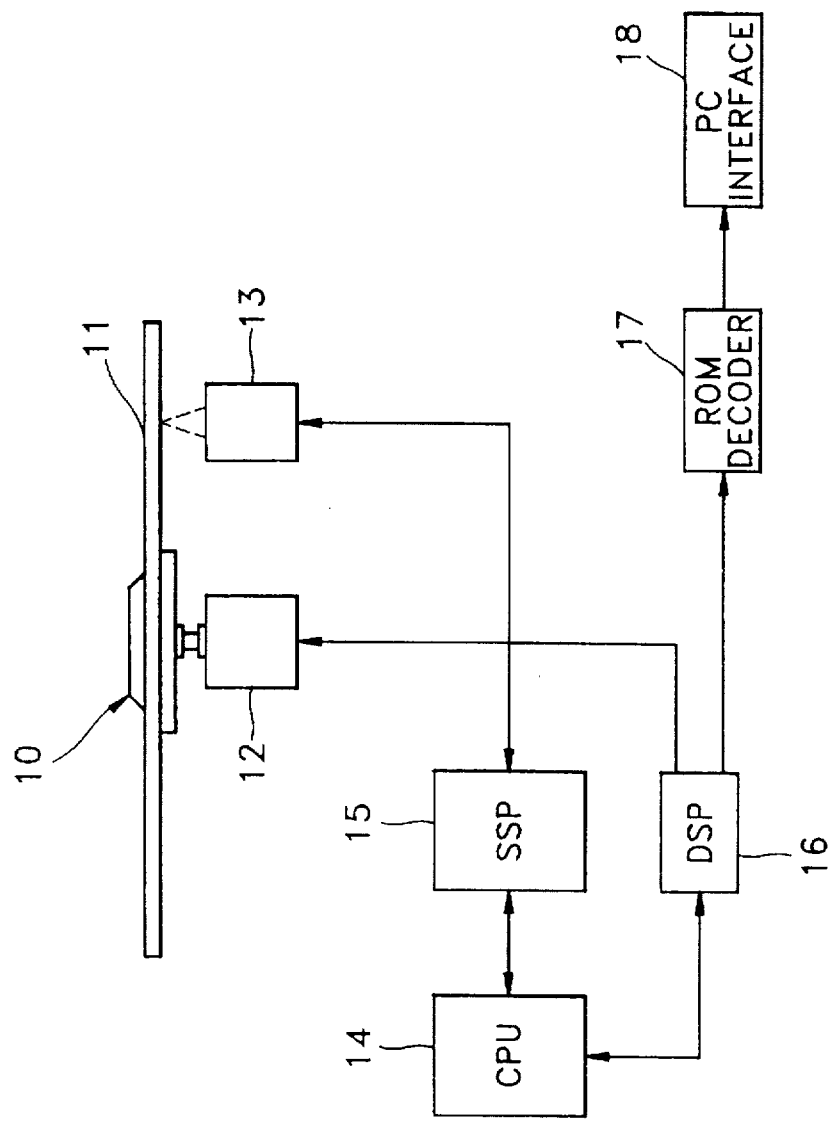
FIG. 1 is a schematic view showing the construction of a general disk drive.
Figure 2:
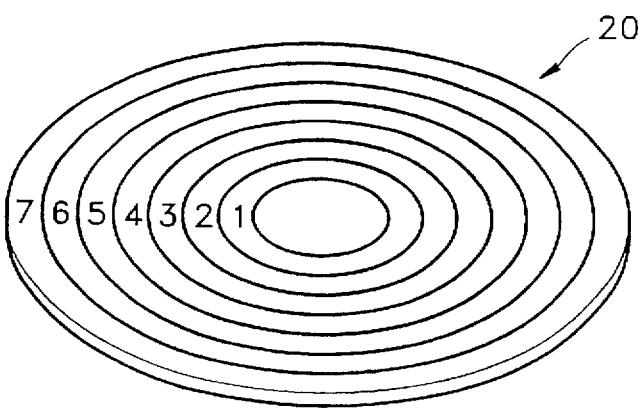
FIG. 2 is a view showing a test disk for testing the operation of a disk drive according to the present invention.

Referring to FIG. 2, in a test disk 20 of the present invention, different predetermined types of data necessary for testing operations of a disk drive are assigned tracks in discrete portions of the disk and are sequentially recorded. Preferably, the data recorded in the disk 20 include contents data 1 of information recorded in the disk 20, normal disk data 2, abnormal disk data including eccentrically recorded data 3 and a scratched region 4, CD-ROM data 5, moving picture data 6, and photo CD data 7.

The data are sequentially recorded on the disk 20 in amounts corresponding to time necessary for each testing operation of the disk drive. Sequence of recording of the data is not limited to the exemplary embodiment.

When the disk 20 having the above-mentioned construction is loaded in a disk drive (not shown) to be tested and data recorded on the loaded disk is reproduced. The contents data 1 which has been stored in the disk 20 is checked, and it is tested whether the normal disk data 2 are reproduced or not. Then, operation of the disk drive with respect to the eccentrically recorded data 3 and the data which have been stored in the scratched region 4, is tested. Sequentially, it is tested whether the CD-ROM data 5, the moving picture data 6 and the photo CD data 7 are reproduced normally in the tested disk drive.

According to the present invention, the operation of the disk drive is tested using one disk having data for testing various function of the disk drive sequentially recorded thereon. Accordingly, since there is no need to exchange plural disks, production time for the disk drives can be shortened and the productivity is enhanced.

Although the present invention has been described with reference to a preferred embodiment, it will be appreciated that various modifications may be made to the described embodiment without departing from the spirit and scope of the present invention.

What is claimed is:

1. A test disk for testing operation of a disk drive, wherein a plurality of types of data necessary for various testing operations of said disk drive are recorded on the test disk, the test disk being divided into track portions and each one of said plurality of types of data being sequentially recorded on a respective one of said track portions of the test disk.

2. The test disk according to claim 1, wherein said types of data comprise correctly recorded disk data, defectively recorded disk data, CD-ROM data, moving picture data, and photo CD data.

3. The test disk according to claim 2, wherein said defectively recorded disk data is data selected from the group consisting of: eccentrically recorded data and data recorded in a scratched region.

4. The test disk according to claim 2, wherein said types of data further comprise contents data of information recorded in the test disk.

5. The test disk according to claim 2, wherein said defectively recorded disk data includes eccentrically recorded data and data recorded in a scratched region.

* * * * *